UNITED STATES PATENT OFFICE.

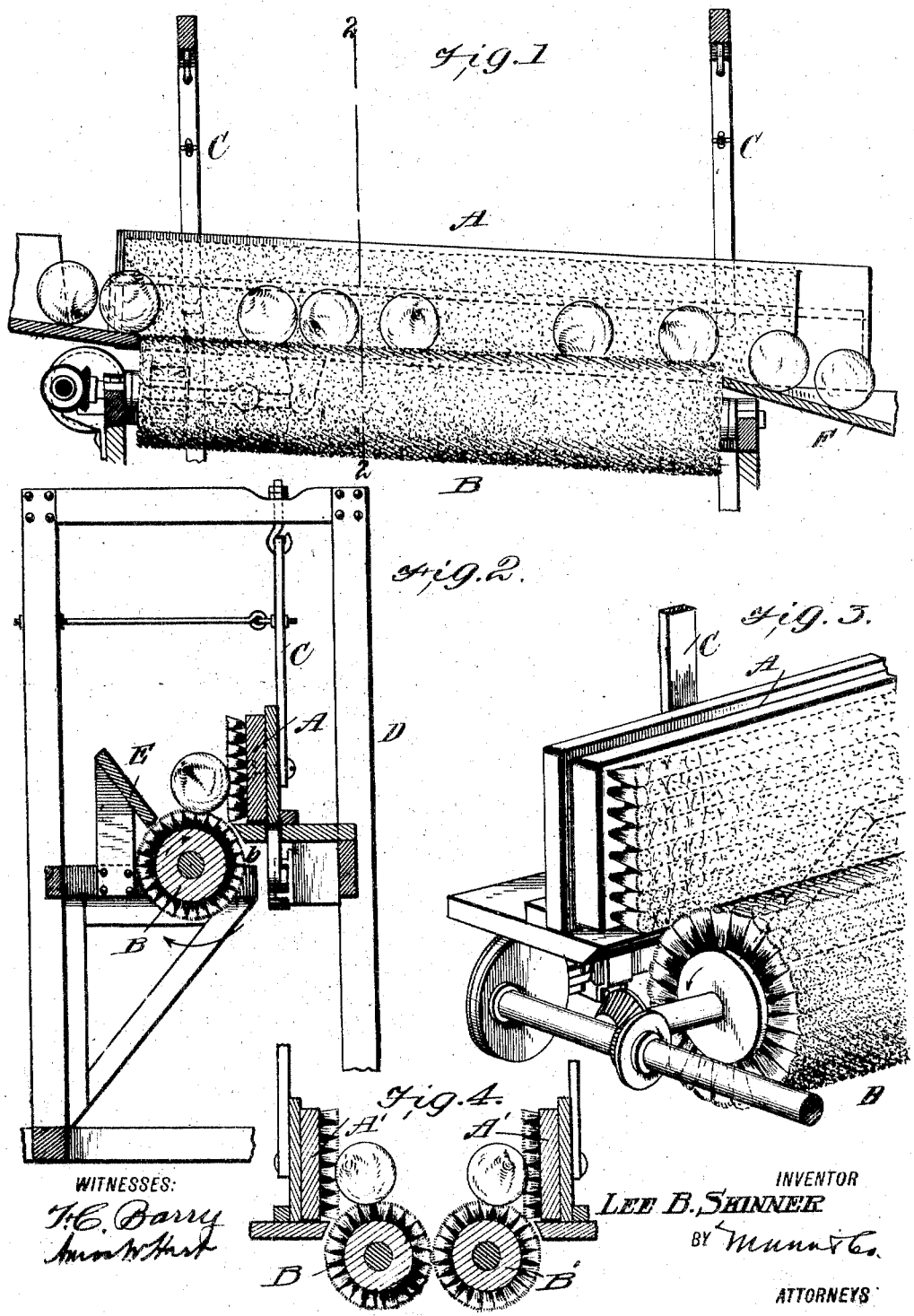

LEE BRONSON SKINNER, OF DUNEDIN, FLORIDA.

FRUIT-CLEANER.

967,680.  Specification of Letters Patent.  Patented Aug. 16, 1910.

Application filed June 2, 1910. Serial No. 564,592.

*To all whom it may concern:*

Be it known that I, LEE BRONSON SKINNER, a citizen of the United States, and a resident of Dunedin, in the county of Hillsboro and State of Florida, have invented an Improved Fruit-Cleaner, of which the following is a specification.

My invention is an improved apparatus for cleaning fruit, such as oranges, lemons, and apples, the operation being effected by means of rotary and reciprocating brushes arranged for conjoint and simultaneous action in the manner hereinafter described, and illustrated in the accompanying drawing, in which—

Figure 1 is a vertical sectional elevation of the apparatus. Fig. 2 is a cross section on the line 2—2 of Fig. 1. Fig. 3 is a perspective view of one end of the apparatus. Fig. 4 is a cross section of a modified form of the apparatus in which two sets of brushes are employed.

I will first describe the invention as illustrated in Figs. 1, 2, and 3.

A indicates a flat reciprocating brush, and B a rotary brush arranged in proximity to the lower edge of the flat brush. By means of suitable gearing, such, for example, as illustrated in Figs. 1, 2, and 3, endwise reciprocation is imparted to the brush A and rotation to the brush B, in the direction of the arrow, or toward the flat brush. The latter is suspended by pivoted, swinging hangers C which are suspended in a frame D, and the rotary brush is also journaled in the same frame, as shown in Figs. 1 and 2. On the outer side of the rotary brush B I arrange an inclined board E, which, together with the flat brush A, forms a trough into which the fruit to be cleaned is delivered, as illustrated in Fig. 1. It will be seen that the rotation of the brush B in the direction of the arrow (Figs. 2 and 3) carries the fruit over against the flat brush A, which is constantly reciprocated at the same time, and thus the fruit is subjected to two brushing actions, whereby it is rapidly and thoroughly cleaned. The rotary brush carries the dirt or other foreign material adhering to the fruit down in the space $b$ indicated in Fig. 2. The two brushes A and B being placed at a slight longitudinal inclination, the fruit tends to roll or travel along the two brushes in contact with both, and is delivered at the lower end upon an inclined board F, or into any suitable receptacle. It will be seen that the flat brush A has a compound movement in view of its swinging supports C; that is to say, it swings endwise in the arc of a circle, which movement aids to a considerable degree in quickly and effectively cleaning the fruit.

In Fig. 4, I illustrate a double form of the apparatus, that is to say, one in which two flat brushes A' are arranged opposite each other and spaced apart, and two rotary brushes B and B' arranged side by side each in the same relation to one of the flat brushes as the brush B to the brush A in Figs. 1, 2, and 3. In other words, by this arrangement I provide a trough whose sides are formed of flat brushes A' and whose bottom consists of two rotary brushes that are driven in opposite directions, each toward the adjacent flat brush A'. The fruit may be delivered freely into such trough and upon and into contact with the rotary brushes, which will then carry the fruit right and left into contact with the opposite flat brushes, by whose coöperation with the rotary brushes the cleaning will be quickly effected.

It will be understood that I do not restrict the use of my invention to fruit, since it is applicable to cleaning certain vegetable and other products.

What I claim is:—

1. The improved cleaning apparatus, comprising a flat brush and pivoted hangers by which it is suspended, a rotary brush arranged adjacent and parallel to the lower edge of the flat brush, and means for both reciprocating one brush and rotating the other, substantially as described.

2. An improved fruit-cleaning apparatus, comprising two flat brushes arranged opposite each other and spaced apart, two rotary brushes arranged alongside and between the lower edges of the flat brushes, whereby a brush trough is formed as described, and means for simultaneously reciprocating the flat brushes, and driving the rotary brushes in opposite directions, each toward the adjacent flat brush, as shown and described.

LEE BRONSON SKINNER.

Witnesses:
 CAROLINE L. MORTON,
 GERTRUDE P. MORTON.